United States Patent Office 2,699,894
Patented Jan. 18, 1955

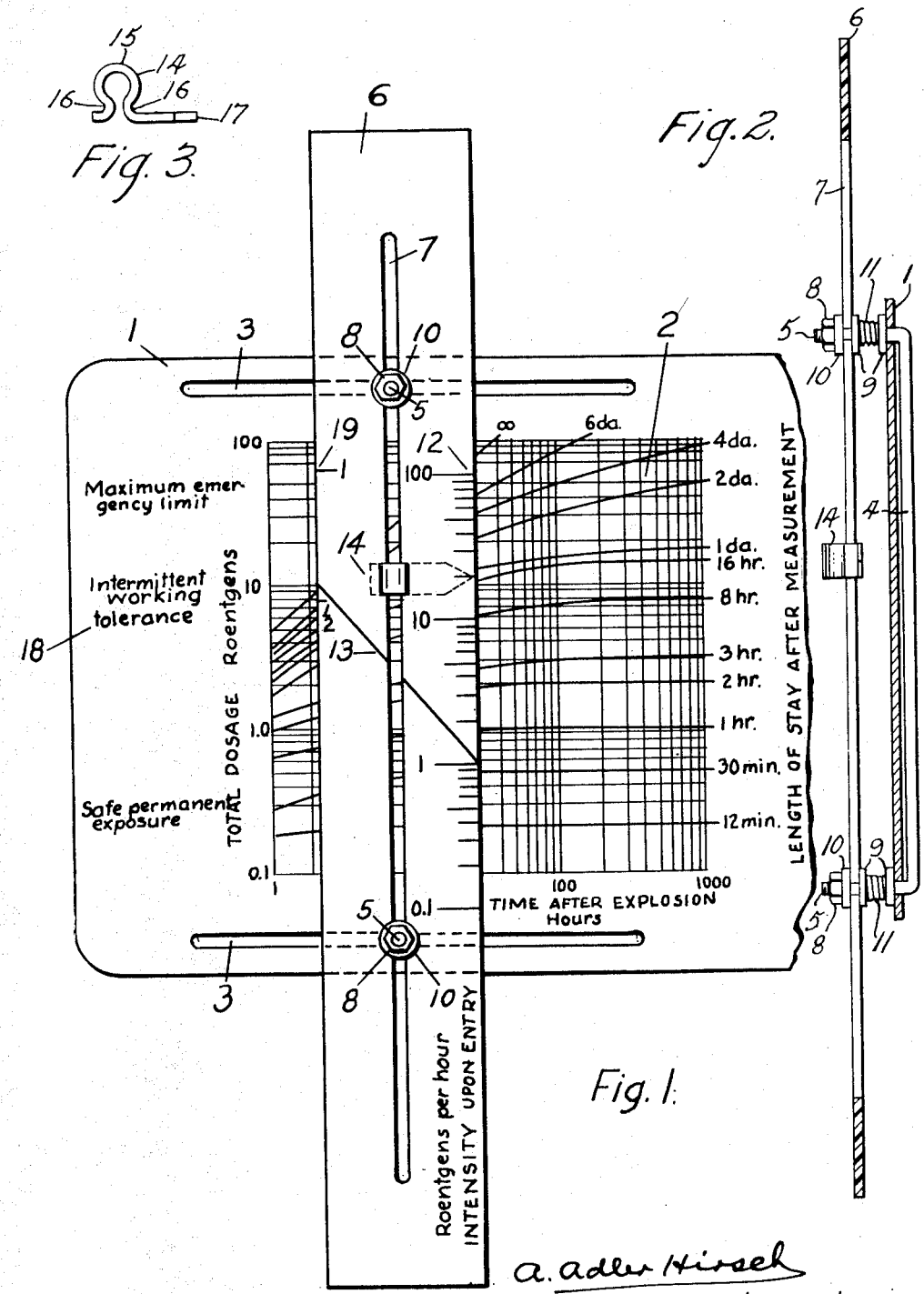

2,699,894

SLIDE RULE TYPE CALCULATOR FOR A-BOMB RADIATION MONITORING

Abraham Adler Hirsch, New Orleans, La.

Application July 18, 1951, Serial No. 237,356

7 Claims. (Cl. 235—61)

My invention is a calculating aid of the slide rule type which readily solves important problems relating to radiation hazards likely to be encountered in monitoring surveys following a nuclear bomb explosion. It consists essentially of a logarithmic graph with parametric curves, over which an attached moveable sliding scale operates in two dimensions. The variables represented thereon are: on the slide, instantaneous intensity readings, roentgens per hour, upon entering a radiated area; on the graph plate, time interval after the explosion in hours and an unlabelled algebraic function, which will be explained later, as coordinates, with length of stay as the parameter. Although my primary object is to provide a slide computor for use in radiological monitoring, other more general objectives are as follows:

To provide a combination of sliding scale and graph for solving problems in which one or more of the variables cannot be isolated in the basic equation.

To devise a simple method of construction by which a graduated sliding bar is attachedly shiftable along the two coordinate axes of the graphical diagram with which it cooperates.

To provide on the sliding bar a method to project points on the graph with respect to one of the coordinate variables, by means of a properly sloped line.

Details of construction and of delineation of the calculator are shown in the drawings in which Figure 1 is a front view and Figure 2 a cross section through the slot in the slide member. Figure 3 is an elevation of the flexurally retained index strip.

In the drawings 1 is a base plate on the face of which is printed or otherwise applied the graphed area 2. Parallel slots 3, fairly close to the top and bottom edges of the base plate permit, at its rear, sidewise shifting of coordinating bar 4. The top and bottom ends 5 of the bar are bent at right angles to pass through the slots in the base plate and also act as guide pins for longitudinal motion of the slide 6. The slide contains a long slot 7 through which the two guide ends 5 of the coordinator rod 4 pass. These guide ends are headed, as by nuts, to prevent separation of the slide from assembly with the base plate. A pair of intermediate washers 9 and a cover washer 10 retain and guide the slide from both ends of the coordinating bar. A few turns of a weak coil spring 11 placed between the intermediate washers causes frictional resistance against both transverse and longitudinal motion of the slide and thereby maintain it in any position as set. The edges of the slide are graduated into a scale 12, as desired, and the face of the slide is marked with an oblique line 13 for the purpose of projecting points across the coordinate scales of graph 2. For this operation slide 6 should be transparent. A sliding index 14, made of thin spring-like material, cut and bent to form an open loop and handle 15 with tracking kinks 16, as shown in Figure 3, moveable against its own frictional resistance in slot 7, aids in a sighting graduations of scale 12 by means of the pointer tip 17.

Movement of the slide laterally also shifts coordinating bar 4 likewise. This bar tends to retain the slide in alignment with the vertical axis of the graph. In its lateral motion sufficient clearance is provided between the coordinating bar and the rear face of the base plate, by means of the incidental offset caused by the slight radius of curvature at the bent ends, that direct contact and scraping against the rear surface is prevented. Longitudinal motion of the slide parallel to its own long edge is accomplished under the head nuts 8, and does not move bar 4.

For application to problems in radiation monitoring the base plate graph is derived from an equation representing the decay in intensity from heterogeneous emitters according to the law $$I = I_0 t^{-1.2} \quad (1)$$

in which $I$ is the intensity of radiation at any time $t$ in hours for which $I_0$ is the intensity one hour after the explosion. Hence the dosage of radiation $D$ received during any time interval from $t_1$ to $t_2$ is given by $$D = I_1 \int_{t_1}^{t_2} t^{-1.2} dt \quad (2)$$

which integrates to $$D = 5 I_0 (t_1^{-0.2} - t_2^{-0.2}) \quad (3)$$

As it is desirable to base calculations on instantaneous values of $I$ as measured without need for converting intensities to what they were at the arbitrary time of 1 hour after the explosion, substitute (1) in (3); then after simplifying $$D = 5 I_1 [t_1 - t_1^{1.2} t_2^{-0.2}] \quad (4)$$

which gives the total dosage received by remaining in the radiated area from time $t_1$ to time $t_2$ after the detonation, knowing that the intensity at time of entry $t_1$ was $I_1$.

Let $s$ = length of stay in radiated area, in hours then $t_2 = t_1 + s \quad (5)$ substitute (5) in (4); this is the fundamental equation of the calculator:

$$D = 5 I_1 [t_1 - t_1^{1.2} (t_1 + s)^{-0.2}] \quad (6)$$

In the function $5[t_1 - t_1^{1.2}(t_1 + s)^{-0.2}]$ the two variables cannot be separated and hence its value cannot be calculated by an ordinary bar type of slide rule. Therefore this function is plotted graphically using logarithmic coordinates on the base plate of the calculator; $t_1$ is the abscissa, $s$ the parameter and the ordinate gives the value of the function corresponding to any simultaneous values of the variables, thus on the graph $X = \log t_1$
$Y = \log 5[t_1 - t_1^{1.2}(t_1 + s)^{-0.2}]$
Parameter $= s$ in which variations of $s$ from 12 minutes to infinity are provided for by the parametric curves, and changes in $t_1$ cover periods from 1 to 1000 hours after the explosion.

In order to calculate dosage, the value of the foregoing function must be multiplied by the measured intensity $I_1$ as read at the time of entry on a radiation rate instrument. A logarithmic scale 12 representing $I_1$ is ruled on the right hand side of the slide to the same modulus as the logarithmic graph. Therefore by shifting the slide to an abscissa position corresponding to $t_1$ and setting its index to the considered length of stay $s$, readings on the graph opposite the initial intensity value $I_1$ on the slide gives the corresponding dosage acquired, according to the relation $$\log D = \log Y + \log I_1$$

thus $D$ is obtained from the log $I_1$ increment added by the slide to log $Y$. For convenience the numeration on the ordinate axis is marked directly in units of $D$. Nevertheless, the numerical value of $Y$ is also readable, as noted from definition, although it has no utility in this aspect.

Oblique line 13 on the slide is drawn at a slope of $-1.2$ (approximately 50°) from the horizontal in conformity with the exponent in Equation 1. Therefore all points falling under it on the graph follow the $t^{-1.2}$ law of attenuation, and hence it may be used to determine variation of intensities at a given point with respect to time. This line is shown scribed through unity position on the right hand edge of the slide for convenience and prominence.

The marks on the left hand margin 19 of the slide enable calculation of the radiation dosage received within the first hour after the explosion. Ordinarily this operation is of no direct interest in the task of monitoring, since in a blasted area a considerably longer period will usually be required for a monitoring crew to push through wreckage to approach near the epicenter. However such a calculation is of interest to the medical squads and hospitals to enable assessment of the dosage received by victims near the ground zero area. Graduations are furnished for two points for exposures during the complete first hour, as for a victim confined within the area, and for the second half hour period, as for exceptionally early arrival within the radiated zone. These positions on the slide are derived from Formula 3 on the basis of unit intensity at the end of the first hour after the burst. Thus in the case of the 1-hour mark $$Y = \log I_0$$
$$\log D_{1\ hr.} = Y + \log \text{ (residual radiation dosage at 1 hour per unit value of } I_0\text{)}$$

marked for convenience as a length from the upper terminus of the oblique line on the slide. The dosage from 1 minute, at the arbitrary start of residual radiations, to 1 hour, when unit intensity prevails at 1 hour is obtained by substituting $t_1 = 1/60$, $t_2 = 1$ and $I_0 = 1$ in Equation 3.

The mark for the second half-hour is established in a similar manner by substituting $t_1 = 0.5$, $t_2 = 1$ and $I_0 = 1$ in Equation 3.

Specific directions for application of this calculator to typical monitoring problems and to the problem of dosage received during early exposure follow:

1. To find dosage, knowing intensity at time of arrival and length of stay:

Align right edge of slide with time after explosion on graph, and set 1 on slide to length of stay curve; opposite intensity value on slide read dosage from horizontal lines on the graph.

2. To find permissible length of stay, given intensity measurement at time of arrival:

Align right hand edge of slide to time of arrival; set initial intensity on slide opposite dosage level desired; by 1 on slide read the intersecting length of stay curve, interpolating if necessary on graph.

3. To determine intensity at 1 hour after explosion from a reading taken at some other time:

Set right hand edge of slide along time of measurement on graph with 1 on slide at the horizontal line equal to the observed intensity. Read intersection of the oblique line with the left hand margin of the graph. If the initial entry time exceeds about 12 hours, one or more stepwise shifts of the slide must be made.

4. To estimate intensity at any time, given a value at some other time:

Align right hand edge of slide at time of reading with oblique line passing through horizontal level equal to value as read. For intensity at any other time note the intersection of the oblique line with the vertical time line desired. Intensities may be calculated either forward or backward with respect to time. Stepwise shifts of the slide will be required if the logarithmic time interval is wide.

5. To find dosage for any length of stay, given an intensity reading not taken at the time of arrival:

First find the intensity at time of arrival using procedure under part 4; then apply the basic method of part 1.

6. To find dosage acquired by occupants of an area during the first hour after the explosion:

Knowing the intensity at the time of measurement, first find the intensity at the end of the first hour using part 4. On ordinate scale, at intensity after first hour, set the left hand edge of the oblique line as an index. Read opposite 1 the dosage received during the first full hour. Similarly read opposite ½ the dosage accumulated during the second half hour.

To further facilitate use of this calculator interpretative labels 18 have been added as shown in Figure 1 to mark the upper limits of various tolerance levels as stated. In an actual calculator the intervening areas are demarked by tinting in suggestive colors, such as

| Color | Dosage level— roentgens |
|---|---|
| Pale blue | below 0.2 |
| Yellow | 0.2 to 10 |
| Brown | 10 to 50 |
| Red | above 50 |

Directions for use of this calculator may be conveniently printed on the rear surface of the base plate.

For purposes of patent coverage, I claim:

1. A calculator consisting of a flat sheet on which a graph to a system of coordinate axes is plotted and a transparent scaled slide shiftably attached directly thereto through a medially disposed means in a manner to cooperate in calculations therewith in each of the two mutually perpendicular dimensions lying in the plane of said flat sheet said slide being constrained to remain parallel to the ordinate axis of said graph and being provided with elastic means for retention in any position as set.

2. A calculator consisting of a flat base plate on which a graph to a system of coordinate axes is plotted and a transparent scaled slide shiftably attached thereto for coplanar motion therewith along two mutually perpendicular axes in which said base plate is slotted transversely near its top and bottom edges and to a sufficient distance from its sides to permit lateral motion of said slide over the full graphed area, and having a coordinator bar slideably mounted to pass and move transversely over the rear face of said base plate and bent so as to pass through said slots in said base plate, and in which said slide contains a longitudinal medial slot through which said bends in said coordinating bar pass to allow said slide to shift always parallel to the ordinate axis of said graph, and to slide longitudinally at a set abscissal position, and a nut and washer retention means on said bent ends against a coil compression spring to attach said slide to said coordinating bar with a slight pressure against said base plate.

3. Claim 2 in which a pointer is provided in the slot of said slide to operate against its own flexural pressure, said pointer being a resilient strip bent to form an incomplete loop with trackways on each end of said incomplete loop and terminating in a tail piece on one end and a pointed tip on the other end which travel underneath the slide.

4. A calculator for A-bomb radiation monitoring, constructed as in claim 2, in which the graph on the base plate is logarithmically scaled according to the function $5[t_1 - t_1^{1.2}(t_1+s)^{-0.2}]$ in which $t_1$ is the time after the explosion and $s$ the length of stay, both in hours, with one ordinate as $t_1$, a family of parametric curves as $s$, with the remaining ordinate as the value of the function, and in which the slide is logarithmically divided to represent the radiation intensity on entry into an area.

5. A calculator consisting of a flat base plate on which a graph is plotted and a transparent scaled slide shiftably attached thereto in which said base plate is slotted near two parallel edges in a direction parallel thereto and to a sufficient distance from the other edges, perpendicular to said slots, to permit lateral translatory motion of said slide over the full graphed area, and having a coordinator bar, bent so as to pass through said slots, and slide parallel therewith over the rear surface of said base plate, and in which said slide is slotted longitudinally to pass said bends in said coordinating bar so as to allow said slide to shift parallel to a coordinate axis of said graph and also, with concurrent motion of said coordinating bar, to permit said slide to travel along the other coordinate axis of said graph, and a retention means on the ends of said bends, with a spring member on said bends between said slide and said base plate.

6. An A-bomb radiation monitoring calculator consisting of a flat baseplate on which a graph to coordinate axes is logarithmically scaled according to the function $5[t_1 - t_1^{1.2}(t_1+s)^{-0.2}]$, in which $t_1$ is the time after the explosion, represented on the ordinate scale, $s$ is the length of stay, represented as a family of parametric curves, and the remaining coordinate is the value of the function, and a transparent, logarithmically scaled slide representing radiation intensity on entry into an area, said slide bearing an oblique line of proper slope corresponding to the exponent in the basic equation for decay of radioactive fission product mixtures, and said flat base plate being slotted transversely near its top and bottom edges and to a sufficient distance from its sides to permit lateral motion of said slide over the full graphed area, and having a coordinator bar slideably mounted to pass and move transversely over the rear face of said base plate and bent so as to pass through said slots in said base plate, and in which said slide contains a longitudinal medial slot through which said bends in said coordinating bar pass to allow said slide to shift always parallel to the ordinate axis of said graph and to slide longitudinally at a set abscissal position, and a nut and washer retention means on said bent ends against a coil compression spring for attaching said slide to said coordinating bar with a slight pressure against said base plate.

7. An A-bomb radiation dosage calculator, as in claim 6, in which one ordinate edge of said slide is graduated in accordance with the basic attenuation calculation to enable calculation of early acquired dosages based on intensity of radiation as determined 1 hour after the explosion.

References Cited in the file of this patent

UNITED STATES PATENTS

| | | |
|---|---|---|
| 1,383,492 | Seely | July 5, 1921 |
| 1,488,190 | Block | Mar. 25, 1924 |
| 2,432,738 | Fairbanks | Dec. 16, 1947 |
| 2,470,495 | Kohn et al. | May 17, 1949 |
| 2,520,904 | Boehm | Sept. 5, 1950 |

OTHER REFERENCES

"Graphical and Mechanical Computation," by Joseph Lipka, published in 1918 by John Wiley and Sons of New York; pages 22, 23, 24, 32, 33 and 35.